REFLEXED BINARY ADDER WITH INTERSPERSED SIGNALS

Filed April 10, 1957 2 Sheets-Sheet 1

INVENTOR.
MORSE MINKOW
BY Charles C. Allyn
ATTORNEY.

REFLEXED BINARY ADDER WITH INTERSPERSED SIGNALS

Filed April 10, 1957

INVENTOR.
MORSE MINKOW
BY
Charles C. Allyn
ATTORNEY.

3,116,412

REFLEXED BINARY ADDER WITH INTERSPERSED SIGNALS

Morse Minkow, Bronx, N.Y., assignor, by mesne assignments, to Curtiss-Wright Corporation, Carlstadt, N.J., a corporation of Delaware Filed Apr. 10, 1957, Ser. No. 651,877
17 Claims. (Cl. 235—170)

This invention relates to data processors and more particularly to processing units that handle information represented by a distribution of signals.

In data processors, information is usually represented in a number of ways. Some of the more common ways are the presence or absence of holes on a perforated record medium, or the presence or absence of electrical signals on conductors.

To speed data processing operations, electrical and electronic techniques are replacing perforated record medium techniques in many applications. Electrical techniques are concerned with the transmission, sensing and changing of electrical signals which represent items of information. An item of information may be a number or a word. Each item generally comprises several alphabetic or numeric characters which in turn may be a coded combination of binary digits.

The binary digits or bits are considered as the basic information unit. The binary digits are usually designated by a "1" or a "0." Binary digits are easily represented electrically as the presence or absence of signals. For example, a binary "1" is represented by the presence of a signal and a "0" by the absence of a signal.

Two classes of data processors have been developed which handle bits represented by electrical signals. The first class is usually known as the parallel type processors while the other class is known as the serial type processors.

Parallel type processors handle all the bits in an item simultaneously. Thus if an item of information comprising fifteen bits is to be routed from one location to another fifteen separate conductors each handling one bit are required; likewise if an item of information is to be operated upon, a plurality of similar units are required. Parallel processors can achieve high speeds but require a large duplication of equipment.

For a slight reduction in speed a great reduction of equipment may be obtained by using serial type processors. A serial processor handles each of the bits in an item of information in time sequence. Thus if an item of information comprising fifteen bits is to be transmitted from one location to another only one conductor is required. However, the time of transmission is longer since all signals are transmitted over one conductor and each signal is separated from another by a unit of time.

For serial type processors, a master clock is provided which generally generates periodically occurring square wave signals that are known as clock pulse signals. These clock pulse signals are then fed to all units of a serial type processor to provide synchronization signals. The information signals are usually pulse signals synchronized with the clock pulse signals. In order to provide refinements in the timing of signals at least two phases of clock pulse signals are generated and the information signals are in phase with one or the other phase of the clock pulse signals.

Generally, each bit of information is assigned a unit of time equal to a clock pulse signal period. A binary "1" is represented by a pulse during the first half of the period and no pulse for the second half and a binary "0" is represented by the absence of a pulse during the entire pulse period. The second half of the period serves only as a separation between pulse signals for adjacent binary "1's." Thus, it is seen that the second half of each pulse period is never used and the time allotted to a unit of information is double an ideal minimum.

Likewise, in a particular unit of a data processor or computer a circuit is handling useful information only half the time. Hence, if two items of information are to be processed it is necessary to either have two similar processing units or to serially process the items of information. The first alternative requires a doubling of the processing equipment and the second alternative requires a doubling of the processing time.

It is therefore an object of the invention to provide improved apparatus for processing data.

It is another object of the invention to provide improved data processing units for handling extra items of information with a negligible increase in apparatus and processing time.

It is a further object of the invention to provide data processing apparatus that utilizes the normally unused portions of the temporal or spatial representations of items of information.

In accordance with the invention, apparatus is provided in the form of an operating unit of a data processor which processes data as represented by information signals. The data processor is of the synchronous type having a master clock which generates periodic timing signals having more than one phase. The timing signals are employed to synchronize the information signals with each other and with other signals and signal receiving units of the data processor.

The information signals are accordingly in phase with one another of the phases of timing signals. The information signals from more than one item of information are then transferred to the operating unit which then processes the information signals in a serial manner. The operating unit is sequentially responsive to information signals in phase with the first phase of timing signals, and then to information signals in phase with another phase of timing signals. By interweaving the information signals both items of information are processed by one unit in about the same time previously required for processing a single item of information.

It should be noted that the interleaving of information signals in an operating unit permits the operating unit to utilize the unused portion of the period of signals which are in phase with the first phase of timing signals to process signals which are in phase with another phase of timing signals.

Other objects, features and advantages of the invention will be evident from the following detailed description when read in connection with the accompanying drawings wherein.

Figure 1:
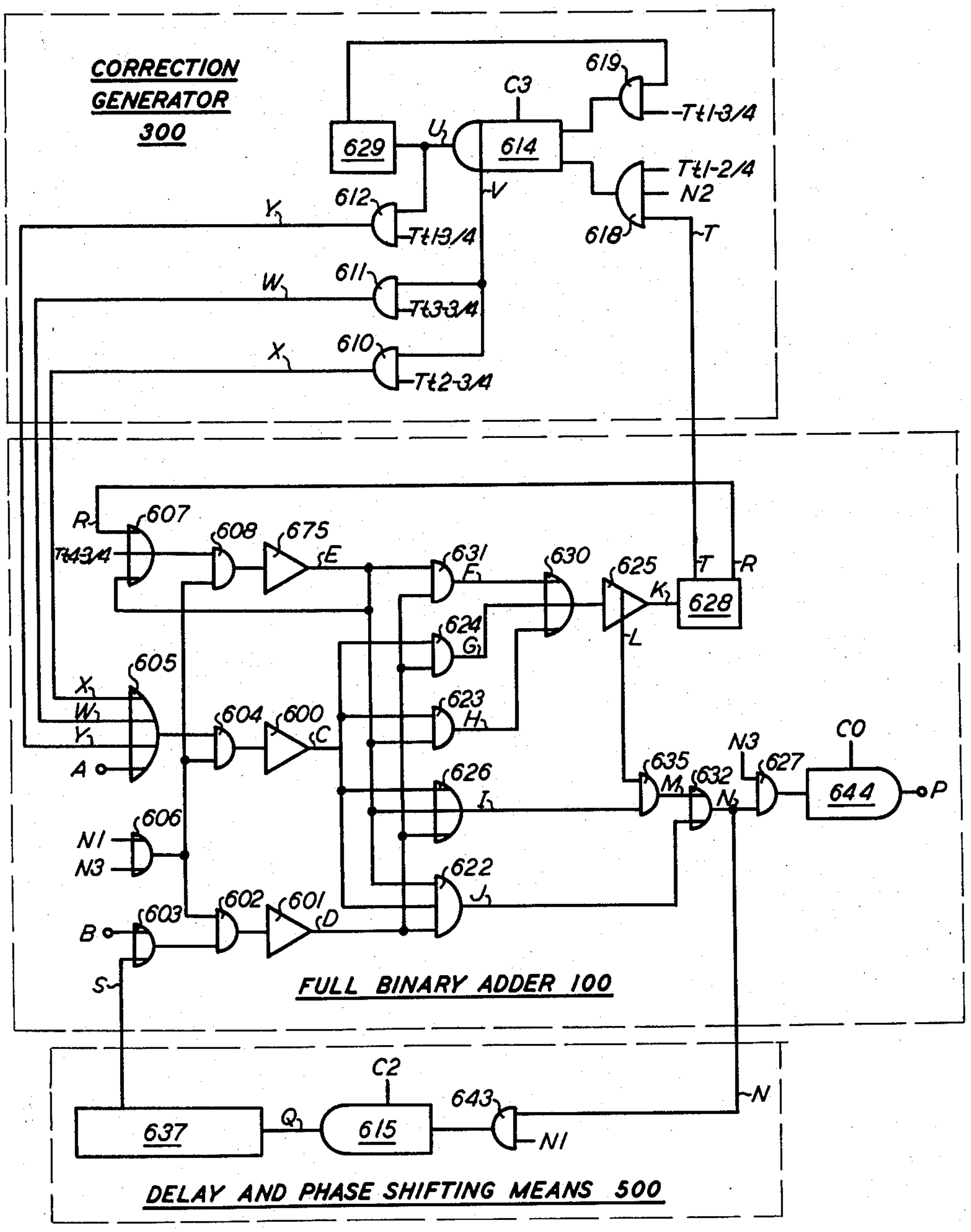
FIG. 1 is a symbolic diagram of a decimal adder for handling excess-three coded binary numbers.

One of the more common operating units of a data processor is an adder. The structure of an adder depends on the type of digits being handled and the mode of operation of the data processor. Adders are either binary or decimal. Decimal adders handle binary coded decimal digits. Usually four binary digits are used to represent each of the decimal digits.

Of the numerous four binary digit codes the excess three code has many attractive features and is therefore used in many data processors.

In this code, a decimal number is coded digit by digit, each decimal digit being represented by four binary digits representing a value of 3 greater than that of the decimal digit. In Table I, the code is shown.

*Table I*

| Decimal digit: | Coded representation |
|---|---|
| 0 | 0011 |
| 1 | 0100 |
| 2 | 0101 |
| 3 | 0110 |
| 4 | 0111 |
| 5 | 1000 |
| 6 | 1001 |
| 7 | 1010 |
| 8 | 1011 |
| 9 | 1100 |

There are two primary advantages of the excess-three representation in decimal arithmetic using a binary code. The first is the ease of obtaining the 9's complement of a digit. The 9's complement of a number is the number obtained by subtracting each digit of the number from 9—i.e., the 9's complement of 623 is 999−623=376. Because of the symmetrical properties of the excess-three code, the 9*'s* complement of any digit is obtained by simply interchanging 1's and 0's—thus, for example, the code for 6 is 1001, and the code for 3 (i.e., 9−6) is 0110. If subtraction is performed by complementing the subtrahend and adding it to the minuend, this simplicity of complementing is quite an advantage.

The second advantage of the code has to do with carrying from one decimal denomination to another. In adding two decimal numbers, we require a carry from one denomination to the next higher denomination whenever the sum in the first denomination is 10 or greater. When using a binary coded decimal system, we would like a code which will produce this interdigit carry from denomination to denomination as a result of a simple binary addition of the coded numbers. An example of addition of straight binary coded numbers and excess-three coded numbers should make this point clear. Consider first the addition of 25 and 36 as represented by straight binary code (the so called 8, 4, 2, 1 code) where four bits are used per digit, decimal 1 is coded as 0001, and the remaining digits follow in order.

| | | |
|---|---|---|
| 25= | 0010 | 0101 |
| 36= | 0011 | 0110 |
| | 0101 | 1011 |

Here we not only fail to get an interdigit carry, but the second digit of the sum is out of range—i.e., it is 11, whereas no coded digit should be greater than 9.

The same addition in excess-three code is as follows:

| | | |
|---|---|---|
| 25= | 0101 | 1000 |
| 36= | 0110 | 1001 |
| | 1100 | 0001 |

Here the result appears to have no relationship with the true answer, but an interdigit carry, the carry from bit position four to bit position five, was performed. (As used herein "interdigit carry" and "tens carry" signify a carry from a decimal denomination to the next higher decimal denomination, and "interbit carry" signifies a carry from one binary denomination to the next higher binary denomination.) Since the straight binary code has four bits per digit, there will be an interdigit carry whenever the pure binary or uncorrected sum in one denomination exceeds 15 (1111). With the excess-three code this pure binary or uncorrected sum will be 16 (10000) or greater whenever the decimal sum is 10 or greater. Since the two numbers being added are each in an excess-three code, their uncorrected sum is in an excess-six code. If $a$ and $b$ are two decimal digits, then the addition in excess-three code is as follows:

$$(a+3)+(b+3)=a+b+6$$

In light of the fact that an addition of two excess-three coded digits results in a sum in an excess-six code it would seem that the correction needed is to subtract three from each digit of the sum. If this is done in the above case (25+36) the result is partially correct. The most significant digit then does become a six, but the least significant digit becomes more meaningless in terms of the excess-three code. It should be noted that the sum in the more significant denomination did not generate an interdigit carry while that of the least did. When there is a carry from one decimal denomination to the next, the excess-six is "used up" or dissipated in the interdigit carry pulse.

This may be seen more clearly as follows: In working with ordinary decimal numbers, we simply carry from one denomination to the next whenever the sum in the first denomination is 10 or greater. In effect when we carry, we subtract 10 from the sum in the lower denomination (that is, we write only the units digit for that order and carry the ten's digit). In using the excess-three code, however, we carry whenever the uncorrected sum in a decimal order is 16 (10+3+3) or greater, and we write for that order the uncorrected sum, less 16. In other words, when there is a carry we still have an excess-six result, but we subtract 6 from more than 10 (or 16) from that result. Hence, to correct the sum to excess-three code we must *add* 3 to those digits in the sum which produced an inter-digit carry. In the above example, the lower order sum produced an interdigit carry and left a remainder of 0001. Addition of 3 (0011) to this remainder (0001+0011) produces 0100, which is 1 in the excess-three code.

Summing up, then, we have two rules for correction in working with the excess-three code.

(1) Subtract straight binary 3 from each digit of the result unless that digit's denomination produced a tens carry to the next denomination.

(2) Add straight binary 3 to the sum digit in those denominations which did produce a tens carry to the next higher denomination.

Using these rules the example will be redone:

| | | | |
|---|---|---|---|
| | 25= | 0101 | 1000 |
| | 36= | 0110 | 1001 |
| | 61 | 1100 | 0001 |
| Using rule 1 | | −0011 | |
| | | 1001 | |
| | | | 0001 |
| Using rule 2 | | | +0011 |
| | | | 0100 |
| | | 1001 | 0100 |
| | | 6 | 1 |

The addition of straight binary 3 to the sum of digits in a decimal order, when required, cannot in itself produce an interdigit carry. The largest sum in any order results from adding two 9's. Each 9 is represented by binary 12, so the sum is binary 24; subtracting 16 (the interdigit carry) from this leaves a sum of binary 8. Adding 3 to this (rule 2) gives binary 11 (decimal 8) and no interdigit carry occurs. Even adding a tens carry (in the form of 0001) from the preceding denomination to two 9's will not produce an interdigit carry.

Subtracting straight binary 3, however, is generally accomplished by adding its straight binary 16's complement 13 or 1101. This operation does produce an interdigit carry, which carry must be suppressed to keep it from affecting the higher denomination which is already correct. The correction of the least significant bit of a decimal digit of the uncorrected sum is the same whether binary 3 (0011) or binary 13 (1101) is added, namely addition of binary 1.

In many decimal adders two full binary adders are used to obtain the correct decimal sum. The first binary adder adds the two operands (the augend and the addend) to form an uncorrected sum. The second binary adder then adds the proper correction factor to each decimal digit of the uncorrected sum to form the true coded sum of the two operands.

For example, in the usual excess-three code decimal adder, the augend and the addend are added together in a binary adder to form the uncorrected sum and the uncorrected sum is then fed to a second binary adder where either binary three or binary thirteen is added to each digit of the uncorrected sum to produce a corrected sum. Thus, two identical, serially connected adders are required to produce a correct sum for the addition of the binary coded decimal numbers.

Referring to FIG. 1 apparatus is shown which accomplishes the same result by using one full binary adder which operates on a time sharing basis. Although the decimal adder shown in FIG. 1 is for decimal digits in the excess-three code the invention is equally applicable to decimal adders that add decimal digits represented by other codes.

The decimal adder comprises a full binary adder 100, a correction generator 300, and a delay and phase shifting means 500.

The full binary adder 100 receives its operand inputs via the input terminals A and B. The terminal A receives the addend and the terminal B receives the augend. The final sum is transmitted from output terminal P. The signal line T couples the full binary adder 100 to the correction generator 300. The signal lines W, X and Y couple the output terminals of the correction generator 300 to other input terminals of the full binary adder 100. The signal line N couples the full binary adder 100 to an input terminal of the delay and phase shifting means 500. The signal line S couples an output terminal of the delay and phase shifting means 500 to an input terminal of the full binary adder 100.

When two numbers in excess-three code are to be added to each other the dynamic bit signals (combinations of presences and absences of pulses) representing the digits of the addend are serially fed to terminal A of the full binary adder 100 with the least significant digit first and least significant bit first. Simultaneously, the dynamic bit signals representing the digits of the augend are fed to the second input terminal B of the full binary adder 100. As the uncorrected sum is formed it is transmitted via the signal line N to the delay and phase shifting means 500. After a predetermined delay and a shift in phase the signals representing the uncorrected sum are fed back via the signal line S to the full binary adder 100. Once during each digit addition in the formation of the uncorrected sum the signal line T is probed by the correction generator 300 to determine the type of correction to be performed upon the sum. The presence or absence of a signal on line T at a particular time during each digit addition indicates whether or not an interdigit carry has occurred. The correction generator 300 is accordingly activated to generate the predetermined set of signals which will perform the necessary correction. These signals are fed via one or more of the W, X and Y signal lines from the correction generator 300 to the addend input of the full binary adder 100. The correction signals are fed synchronously and in phase with the uncorrected sum which is being transmitted from the delay and phase shifting means 500 to the augend input of the full binary adder. The corrected and uncorrected sums then proceed in an interleaved fashion through the full binary adder 100.

The uncorrected sums are transmitted via the N signal line to the delay and phase shifting means 500 while the corrected sums are fed to the output terminal P of the full binary adder 100. In this manner, a bitwise and digitwise serial addition is performed in which an uncorrected sum of numbers represented by serial dynamic bit signals having a first phase is formed. The sum is fed back to the full binary adder 100 in the second phase. and a second bitwise and digitwise serial addition is performed which produces a corrected sum represented by serial dynamic bit signals which is transmitted from the decimal adder.

Each of the units shown is composed of the following logical units: a gate, a buffer, a delay line, a pulse amplifier and a reshaper. The gates ("and" gates) are coincidence circuits which pass from their output terminals the most negative potential present at their respective input terminals. The buffers, often called "or" gates, pass from their output terminals the most positive signal present at their respective input terminals. The delay lines are of the lumped parameter type which transmit from their output terminals at a later time signals received at their input terminals. The pulse amplifiers are transformer coupled pulse amplifiers which transmit from their positive output terminals positive pulses and from their negative output terminals negative pulses when they receive a pulse signal at their respective input terminals. The reshapers are pulse amplifiers which transmit pulse signals that are timed to and in phase with a predetermined clock pulse signal. Logical units 607, 608, 675 constitute a reshaper, as will be apparent from subsequent description. A more complete description of these logical units may be found in the copending application of A. Auerbach et al., Serial No. 471,696, filed November 29, 1954, now Patent No. 2,902,686, granted September 1, 1959.

The full binary adder 100 comprises the carry input buffer 607, the carry input gate 608, the carry input pulse amplifier 675; the addend input buffer 605, the addend input gate 604, the addend input pulse amplifier 600; the augend input buffer 603, the augend input gate 602, the augend input pulse amplifier 601; the narrow pulse buffer 606; the carry generating gates 623, 624 and 631, the carry generating buffer 630, the carry generating pulse amplifier 625; the carry delay line 628 having delays of ¼ pulse time to the T line and ⅞ pulse time to the R line; the unit sum buffer 626; the sum and carry gate 622; the sum inhibiting gate 635; the sum buffer 632; the corrected sum gate 627; and the corrected sum reshaper 644.

The correction generator 300 comprises the reshaper 614, the activating gate 618, the deactivating gate 619 and the three quarter pulse time delay line 629. These four units are so coupled together to form a dynamic flip flop. The correction generator 300 also includes the correction pulse generating gates 610, 611 and 612.

The delay and phase shifting means 500 comprises the uncorrected sum gate 643, the uncorrected sum reshaper 615 and the two and one quarter pulse time delay line 637 connected in series.

The full binary adder 100, the correction generator 300 and the delay and phase shifting means 500 all operate in a synchronous manner. To synchronize their operation several series of clock pulse signals are generated by a timing means (not shown) and fed to the units.

Figure 2:
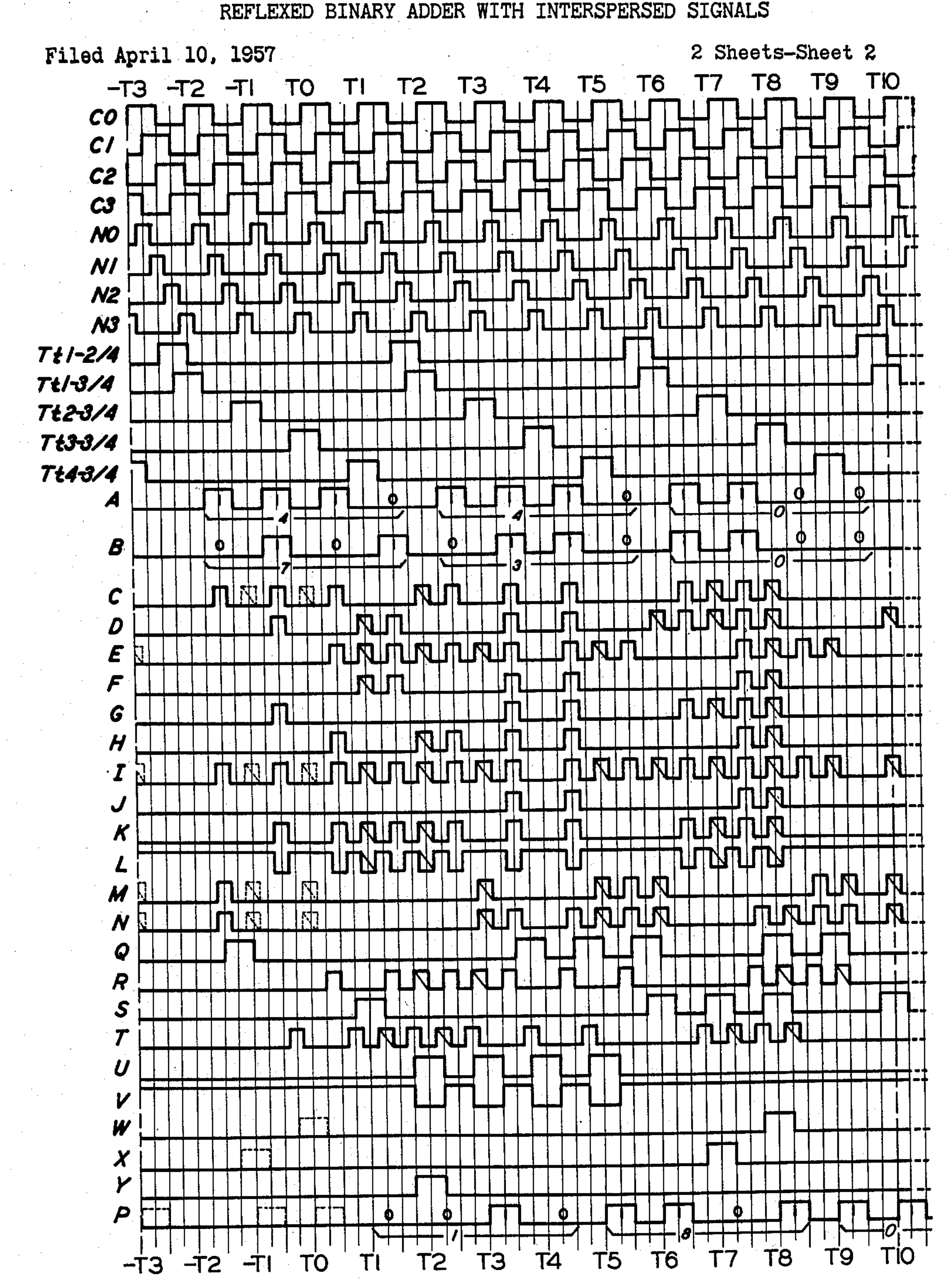
FIG. 2 are the waveforms associated with the operation of the decimal adder of FIG. 1.

In FIG. 2 the clock pulses are shown along with other timing pulses. The C0 clock pulse is a constant frequency square wave signal. The basic unit of time in the apparatus (a pulse time) is considered to be equal to one period of the C0 wave form. The C1 clock pulse is a square wave signal having the same frequency and amplitude as the C0 signal but out of phase by one quarter of a period with the C0 signal. The C2 clock pulse signal is again similar to the C0 clock pulse signal but is delayed one half a pulse period with respect to the C0 pulse signal. The C3 clock pulse signal has the same frequency as the C0 clock pulse signal but is delayed three quarters of a pulse period (270° with respect to the C0 clock pulse signal).

The N0 narrow pulse signal has a frequency equal to the C0 clock pulse signal but has a pulse width equal to one half the pulse width of the C0 clock pulse signal.

The N0 narrow pulse signal is centered within the C0 clock pulse signal. The N1 narrow pulse signal is the same as the N0 narrow pulse signal but is delayed by one quarter of a pulse period. The N2 narrow pulse signal is the same as the N0 narrow pulse signal but is delayed by one half a pulse period. The N3 narrow pulse signal is the same as the N0 narrow pulse signal but is delayed by three quarters of a pulse period.

Several other timing pulses are also employed by the apparatus. For example, the Tt1¾ signal is a pulse signal occurring every fourth C2 clock pulse signal. The Tt1¾ is a signal occurring every fourth C3 clock pulse signal. The Tt2¾ is a pulse signal occurring every fourth C3 clock pulse signal but delayed one pulse period from the Tt1¾ signal. The waveforms of the Tt3¾ and the Tt4¾ signals and their phase relationships to each other are shown in FIG. 2. A signal generator capable of generating these signals is disclosed and claimed in the above cited Auerbach et al. patent.

The remaining waveforms of FIG. 2 show the potentials present on various signal lines of the apparatus of FIG. 1 during the addition of the numbers 044 and 037 as an example. The time reference of the T1 ordinate coincides with start of transmission of the least significant bit of the least significant digit of the corrected sum at the output terminal P.

Referring to FIGS. 1 and 2 the general overall operation of the apparatus will now be described. At —T1¾ that is 1¾ pulse times before the time T0 the least significant bit of the augend 37 enters the full binary adder 100 via the B terminal. At the same time the least significant bit of the addend 44 enters the full binary adder 100 via the A terminal. The signals representing the information being fed to the full binary adder are considered to be in phase with the C1 clock pulse signals.

The binary adder operates according to the well-known rules of binary addiiton, that is, a signal on any one of the three input lines C, D, or E will pass through buffer 626 to pulse lines I, M, and N. A pair of signals on any two of the input lines will pass through buffer 626 to pulse line I and will pass through one of the gates 623, 624, or 631, through buffer 630 to pulse amplifier 625 which produces a pair of pulses on lines K and L. The pulse on line L is a negative pulse and prevents the pulse on the I line from passing through gate 635 so that lines M and N do not receive a pulse. When all three input lines are simultaneously pulsed, gate 622 passes a pulse to the J line, buffer 626 passes a pulse to the I line and gates 623, 624, and 631 pass pulses to buffer 630 to generate the pulses on the K and L lines. The negative pulse on the L line prevents the I pulse from passing through gate 635 but the J pulse passes through buffer 632 to the N line to give an output pulse. The pulses on the K line are delayed ⅞ of a pulse period in delay line 628 before they appear on the R line. Buffer 607, gate 608 and amplifier 675 apply the pulses on the R line as inputs representing carry digits to the E line in synchronism with the input signals of the next higher denomination at terminals A and B.

Figure 2 shows the pulses present throughout the adder of FIGURE 1 during the addition of the factors 044 and 037 of the above example. Prior to the application of signals to terminals A and B, the adder will be receiving Tt4¾ pulses at buffer 607 which are formed by the N3 pulses at gate 608 and amplifier 675 to give pulses on line E. Also the V line from reshaper 614 is normally positive so that the Tt2¾ and Tt3¾ pulses applied to gates 610 and 611 respectively pass through the gates to lines X and W thence through buffer 605 to gate 604 where they are narrowed by the N3 pulses and pass to amplifier 600 for pulsing line C. The three pulses pass through buffer 626 to line I, through gate 635 to line M, through buffer 632 to line N and, as they are in phase with the N3 pulses applied to gate 627, through gate 627 to reshaper 644 which will supply corresponding pulses at terminal P. As these pulses are merely idling signals forming no part of a computation, they are shown dotted in FIGURE 2 and would be eliminated from the useful output signals by the use of gating circuits as is usual in electronic computers. Other well-known methods may be used to suppress either the input signals or the output signals during such idling time.

The first signal pulse at time —T2¼ (that is, ¼ pulse time later than —T2) at terminal A is narrowed by the N1 pulse at gate 604 and appears on line C. This pulse passes through buffer 626 to line I, through gate 635 to line M, through buffer 632 to line N and is passed through the gate 643 by the N1 pulse to reshaper 615. In reshaper 615, the pulse is broadened and retimed with the C2 pulse as shown by the first pulse on line Q. The pulse is delayed 2¼ pulse times in delay line 637 and then appears at time T0¾ on line S. At the second input signal pulse period, the signals at terminals A and B energize lines C and D to pass a pulse through buffer 626 to the I line and also to pass a pulse through gate 624 to the G line. The pulse on the G line passes through buffer 630 to amplifier 625 to effect generation of the positive K and negative L pulses. The negative L pulse at gate 635 will prevent the simultaneous pulse on line I from passing through and thus there will be no corresponding pulse at time T1¾ on the S line. The K pulse will however pass through delay line 628 and appear on line R at T0¼ to pass through buffer 607, gate 608 and amplifier 675 as a pulse on line E centered at T0¾. The third signal from terminal A appearing on line C and the pulse on line E coincide to pulse lines I and H. The pulse on line H causes amplifier 625 to generate the K pulse which passes through delay 628 to line R and as above to line E one pulse time later and to generate a pulse on line L to block the pulse on line I from passing through gate 635 so that no corresponding pulse appears on line S.

At the fourth input signal pulse period, the signal on line D from terminal B and the pulse on line E combine to pulse lines I and F. Line F generates the K pulse for a carry signal and the L pulse acts to block the pulse on line I at gate 635 so there is no corresponding pulse on line S. All succeeding pulses on terminals A and B cause similar pulses to be generated to provide on line S the uncorrected sum of the factors entered. It should be noted that in the above example at time T3¾, lines C, D, and E are all pulsed so that gate 622 passes a pulse to line J. This pulse passes through buffer 632 and line N to generate a corresponding pulse on the S line even though the pulse on line I is blocked by the L pulse at gate 635. Thus the signals on line S represent the uncorrected sum of the two factors entered and it will be noted from FIGURE 2 that the pulses on line S are interspersed between those on terminals A and B and for the above example would correspond to a signal of .... .... 0110 1110 0001.

The same binary adder is used to add the correction factors required by the rules set out above. It will be noted that line T from delay line 628 receives the carry pulses from the K line after a delay of ¼ pulse time. The pulse on line K at time T1¾ represents a decimal tens carry since it is formed by a carry between the fourth and fifth bits of the input factors and in accordance with the rules previously set out, the lowest decimal digit of the uncorrected sum on line S should be corrected by addition of the factor 0011 (decimal 0). Pulses on line T at other times represent carries between the binary bits of the decimal digit and are of no significance so far as the correction operation is concerned. At T1¾ the interdigit carry pulse on line T coincides with the Tt1¾ pulse on gate 618 and with the next N2 pulse will activate reshaper 614. The ¾ pulse delay line 629 and gate 619 will then operate to reactivate reshaper 614 on each output pulse until the —Tt1¾ signal goes negative. This —Tt1¾ signal is the negative of the Tt1¾ signal and is a positive voltage at all times except when the Tt1¾ signal is present at which time it becomes a negative voltage to close gate 619 and stop reactivation of reshaper 614. The C3 signal on reshaper 614 will control the output of reshaper 614 to produce a series of four output pulses on lines U and V whenever the reshaper is activated through gate 618 as shown in FIGURE 2.

Since both correction factors 0011 and 1101 require the entry of the bit in the lowest denominational order, it is not necessary that entry of this bit depend upon the interdigit carry and such bit is entered into the binary adder through buffer 607 by the T*t*4¾ signal. From FIGURE 2, it will be seen that the first significant occurrence of this signal is at T0¾, the same time that the first pulse from the S line is present at buffer 603. The N3 signal will pass these pulses through gates 608 and 602 respectively to the E and C lines. Such pulses are timed by the N3 signal on gates 602, 604 and 608 and, as shown in FIGURE 2, will be interspersed between the signals representing the original factors on terminals A and B. In FIGURE 2, a diagonal line has been made in the pulses representing the correction of the sum on line S to distinguish such pulses from the pulses for the initial addition. The adder reacts to these two pulses on lines D and E in the same manner as set out above to generate a pulse on each of the I, K, and L lines with the L pulse closing gate 635 to block the pulse on line I and with the K pulse appearing on line R at time T1¾. Since the reshaper 614 is pulsing due to the interdigit carry, the first pulse on line U will pass a T*t*1¾ pulse through gate 612 to line Y, and buffer 605, which with the N3 pulse on gate 604 will pulse line C at T1¾. This pulse on line C together with the pulse from line R appearing on line E will pass through gate 623 and line H to generate another K pulse which will appear on line R at T2¾. The pulse on line L will block gate 635 to hold back the pulse on line I and there will still be no output on line M. At time T2¾ the pulse on line R will activate line E, there is no pulse on line S and as reshaper 614 is pulsed at this time, the negative voltage on line V will prevent the T*t*2¾ pulse from passing through gate 610 to line X so that the only input pulse is on line E. This pulse passes through buffer 626 to line I, through gate 635 to line M, through buffer 632 to line N and, since it is synchronized with the N3 pulse on gate 627, it will activate reshaper 644 so that the C0 pulse on the reshaper will pass a pulse at T3 to the output terminal P. Gate 643 is blocked at this time by the negative voltage on the N1 input so that there is no pulse passed to reshaper 615. At time T3¾, there is no pulse on line R, no input on line S and the gate 611 is blocked by the negative pulse on line V so that the T*t*3¾ pulse does not pass to input buffer 605. There will then be no input pulses and no output pulses on output terminal P. Thus the units order digit of the output signal will be 0100 representing 1 in the excess 3 code.

During the addition of the tens digits 4 and 3, it will be recalled that there was no interdigit carry indicating that the factor 1101 was to be added to the sum of these digits. Since there was no tens carry, line T was not pulsed at T5¾ and reshaper 614 will not be activated for the correction of this sum. The required correction factor of 1101 will be formed from the T*t*4¾ pulse on buffer 607, the T*t*2¾ pulse at T*t*6¾ through gate 610 to line X and buffer 605 and the T*t*3¾ pulse at T7¾ through gate 611, and line W to buffer 605. These correction pulses 1101 together with the uncorrected sum signal 1110 on line S will as above described generate the output signal 1011 on the output terminal P. This signal represents the decimal value 8 in the excess 3 code and is the correct tens digit of the sum of the input factors.

In the addition of the above factors of 1101 and 1110, a pulse was generated on line K at T8 and represented an interdigit carry which in accordance with the correction rules set out above is to be suppressed. This pulse will appear on line R and buffer 607 at T8¾. During the time that this pulse is present, however, buffer 607 also receives the T*t*4¾ signal representing the units bit of the next correction factor. Since a buffer passes the same signal when any one or more of its inputs are energized, the resulting pulse on line E, distinguished by a double diagonal line in FIGURE 2, will be independent of the presence or absence of the interdigit carry signal on line R during the sum correction phase and hence such interdigit carry will have no effect on the corrected sum.

For the addition of the third digits of 0 and 0, there is no interdigit carry and the correction factor of 1101, generated as above, will be added to the sum of 0110 on line S to give the output at terminal P of 0011 representing decimal 0 and the interdigit carry on line R which will be ineffective as set out above. The fourth and subsequent digits of the input factors will cause operation of the adder in substantially the same manner as above described to produce an output on terminal P corresponding to the correct sums of these digits.

To summarize the original addend is fed in phase with the C1 clock signals via the A signal line to the addend input buffer 605. The correction addend is fed from the correction generator 300 in phase with the C3 clock pulse signals to the addend input buffer 605 via several of the signal lines W, X and Y. The initial augend is fed via the B signal line to the augend buffer 603 in phase with the C1 clock pulses. The uncorrected sum is fed via the S signal line to the augend input buffer 603 in phase with the C3 clock pulse signals. The full binary adder 100 operates during the C1 time to form the uncorrected sums and during C3 time to form the corrected sums. The corrected and uncorrected sums are then transmitted via the N signal line to both the corrected sum gate 627 and the uncorrected sum gate 643. Since signals representing the uncorrected sums are in phase with the C1 clock pulse signals they pass through the uncorrected sum gate 643 and are blocked at the corrected sum gate 627 and since the corrected sums are in phase with the C3 clock pulse signals they pass through the corrected sum gate 627 and are blocked at the uncorrected sum gate 643.

Thus a decimal adder has been shown which performs decimal additions that include correcting sums to satisfy the conditions of the excess three code. These additions are accomplished by a single full binary adder which performs essentially two simultaneous additions by interleaving the pulse signals associated with each of the additions.

There will be now obvious to those skilled in the art many modifications and variations utilizing the principles set forth and realizing many or all of the objects and advantages of the apparatus described but which do not depart essentially from the spirit of the invention.

What is claimed is:

1. In a data processor, means providing timewise uniformly spaced dynamic serial bit signals representing a set of data, processing means receiving said signals at an input thereof for serially and substantially instantly operating on the signals to produce at an output thereof timewise uniformly spaced dynamic serial bit signals representing a set of processed data, the processed signals being substantially synchronous with the respectively corresponding original unprocessed signals, feedback means for feeding back the processed signals from said output to said input for a second serial processing operation, said feedback means having a time delay less than the time separating the first and the last of the original unprocessed signals but greater than the time separating any two consecutive original signals, said delay being selected so that the once processed signals arrive at said input asynchronously with any newly incoming original signals, whereby at least the next-to-last and last newly incoming signals are interspersed with a single once processed signal, and whereby at least the first and the second once processed output signals are uninterspersed by any twice processed signals and at least the next-to-last and last once processed output signals are interspersed with a single twice processed signal, and means coupled to said output for selectively gating out data-set-representing timewise uniformly spaced dynamic serial bit signals that have been processed a like number of times and at least twice.

2. In a data processor, means providing timewise uniformly spaced dynamic serial bit signals representing a set of data, processing means receiving said signals at an input thereof for serially and substantially instantly operating on the signals to produce at an output thereof timewise uniformly spaced dynamic serial bit signals representing a set of processed data, the processed signals being substantially synchronous with the respectively corresponding original unprocessed signals, feedback means for feeding back the processed signals from said output to said input for a second serial processing operation, said feedback means having a time delay less than the time separating the first and the last of the original unprocessed signals but greater than the time separating any two consecutive original signals, said delay being selected so that the once processed signals arrive at said input asynchronously with any newly incoming original signals, whereby at least the next-to-last and last newly incoming signals are interpersed with a single once processed signal, and whereby at least the first and the second once processed output signals are uninterspersed by any twice processed signals and at least the next-to-last and last once processed output signals are interpersed with a single twice processed signal, and means coupled to said output for selectively gating out data-set-representing twice processed timewise uniformly spaced dynamic serial bit signals while blocking the once processed signals, and for selectively gating to said feedback means the once processed signals while blocking therefrom the twice processed signals.

3. In a computing system having means providing first periodic clock pulse signals and second periodic clock pulse signals, the latter having the same pulse period, but being displaced in time with respect to said first clock pulse signals: means for performing an arithmetic operation on a plurality of numbers represented by serial dynamic bit signals, consecutive bits of each number being essentially synchronous with consecutive ones of said first clock pulse signals, comprising an arithmetic unit accepting said bits at an input thereof for serially processing concurrent input bits to produce at an output thereof a series of dynamic bit signals representing a partial result, feedback means for serially feeding said partial result bits from said output back to said input for a second processing operation, said arithmetic unit and feedback means having an overall time delay greater than one period of said clock pulses but less than the time interval separating the first and last original unprocessed bits, said delay being selected so that the consecutive partial result bits arrive at said input essentially synchronously with consecutive ones of said second clock pulse signals, whereby at least the next-to-last and last originally incoming bits are interspersed with a once processed input bit, and whereby at least the first and the second once processed output bits are uninterspersed by a twice processed output bit, and at least the next-to-last and last once processed output bits are interpersed with a twice processed output bit, and means coupled to said output for selectively gating out the twice processed bits to provide a final result.

4. Means for adding an addend and an augend decimal number, each decimal digit being represented in a multibit code, that is compatible with binary addition rules, by timewise uniformly spaced serial dynamic bit signals, comprising a binary adder accepting said bits at an input thereof for serially adding the concurrent, denominationally corresponding bits of said numbers to produce at a sum output thereof a series of dynamic bit signals representing an uncorrected sum and at a carry output a series of dynamic bit signals representing the presence or absence of an interbit carry, a first feedback loop for serially feeding back the carry bits from said carry output to said input for addition of a given carry bit with the next most significant addend and augend bits, a second feedback loop including delay means for serially feeding back the uncorrected sum bits from said sum output to said input for a second adding operation, said binary adder and second feedback loop having a combined delay greater than two but less than three bit spacings, a third feedback loop responsive to the decimal carry bit appearing at said carry output as a result of addition of the most significant addend and augend bits of a given decimal denominational order for effecting a required decimal correction, including means for applying to said input the dynamic signal bit 1 for addition to preselected fed back uncorrected sum bits of such given decimal denomination, and means for selectively gating out from said sum output the resulting corrected sum.

5. Means for adding an addend and an augend decimal number, each decimal digit being represented in a multibit excess code, that is compatible with binary addition rules, as distinguished from straight binary code, by timewise uniformly spaced serial dynamic bit signals, comprising a binary adder accepting said bits at an input thereof for serially adding the concurrent, denominationally corresponding bits of said numbers to produce at a sum output thereof a series of dynamic bit signals representing an uncorrected sum and at a carry output a series of dynamic bit signals representing the presence or absence of an interbit carry, a first feedback loop for serially feeding back the carry bits from said carry output to said input for addition of a given carry bit with the next most significant addend and augend bits, a second feedback loop including delay means for serially feeding back the uncorrected sum bits from said sum output to said input for a second adding operation, said binary adder and second feedback loop having a combined delay greater than two but less than three bit spacings, a third feedback loop responsive to the decimal carry bit appearing at said carry output as a result of addition of the most significant addend and augend bits of a given decimal denominational order for effecting a required decimal correction, including means for applying to said input the dynamic signal bit 1 for addition to preselected fed back uncorrected sum bits of such given decimal denomination, means for suppressing addition of a false decimal carry to the least significant addend and augend bits of the next higher decimal denomination, and means for selectively gating out from said sum output the resulting corrected sum.

6. Means for adding an addend and an augend decimal number represented in excess-three code by timewise uniformly spaced serial dynamic bit signals, comprising a binary adder accepting said bits at an input thereof for serially adding the concurrent, denominationally corresponding bits of said numbers to produce at a sum output thereof a series of dynamic bit signals representing an uncorrected sum and at a carry output a series of dynamic bit signals representing the presence or absence of an interbit carry, a first feedback loop including an "or" gate for serially feeding back the carry bits from said carry output via said "or" gate to said input for addition of a given carry bit with the next most significant addend and augend bits, a second feedback loop including delay means for serially feeding back the uncorrected sum bits from said sum output to said input for a second adding operation, said binary adder and second feedback loop having a combined delay greater than two but less than three bit spacings, and a third feedback loop responsive to the decimal carry bit appearing at said carry output as a result of addition of the most significant addend and augend bits of a given decimal denominational order for effecting a decimal correction, and including means for applying to said input the dynamic signal bit 1, when a decimal carry has been generated, for addition to the fed back second least significant uncorrected sum bit of such given decimal denomination, and otherwise for addition to its third and also its fourth least significant fed back uncorrected sum bit, a false decimal carry being generated in the latter case, means for applying to said input through said "or" gate the dynamic signal bit 1 in either case for addition to the fed back least significant uncorrected sum bit of each decimal denomination, whereby also to suppress said false decimal carry, and means for selectively gating out from said sum output the resulting corrected sum.

7. Means for adding an addend and an augend decimal number represented in excess-three code by timewise uniformly spaced serial dynamic bit signals, comprising a binary adder accepting said bits at an input thereof for serially adding the concurrent, denominationally corresponding bits of said numbers to produce substantially instantly at a sum output thereof a series of dynamic bit signals representing an uncorrected sum and at a carry output a series of dynamic bit signals representing the presence or absence of an interbit carry, a first feedback loop including delay means and an "or" gate for serially feeding back the carry bits from said carry output via said delay means and then via said "or" gate to said input for addition of a given carry bit with the next most significant addend and augend bits, a second feedback loop including delay means for serially feeding back the uncorrected sum bits from said sum output to said input for a second adding operation, said second feedback loop having a delay greater than two but less than three bit spacings, and a third feedback loop responsive to the decimal carry bit appearing at said carry output as a result of addition of the most significant addend and augend bits of a given decimal denominational order for effecting a decimal correction, and including means for applying to said input the dynamic signal bit 1, when a decimal carry has been generated, for addition to the fed back second least significant uncorrected sum bit of such given decimal denomination, and otherwise for addition to its third and also its fourth least significant fed back uncorrected sum bit, a false decimal carry being generated in the latter case, means for applying to said input through said "or" gate the dynamic signal bit 1 in either case for addition to the fed back least significant uncorrected sum bit of each decimal denomination, whereby also to suppress said false decimal carry, and means for selectively gating out from said sum output the resulting corrected sum.

8. Means for adding an addend and an augend decimal number represented in excess-three code by timewise uniformly spaced serial dynamic bit signals, comprising a binary adder accepting said bits at an input thereof for serially adding the concurrent, denominationally corresponding bits of said numbers to produce substantially instantly at a sum output thereof a series of dynamic bit signals representing an uncorrected sum and at a carry output a series of dynamic bit signals representing the presence or absence of an interbit carry, a first feedback loop including delay means and an "or" gate for serially feeding back the carry bits from said carry output via said delay means and then via said "or" gate to said input for addition of a given carry bit with the next most significant addend and augend bits, a second feedback loop including delay means for serially feeding back the uncorrected sum bits from said sum output to said input for a second adding operation, said second feedback loop having a delay greater than two but less than three bit spacings, and a third feedback loop intercoupling said carry output and input and comprising a bistable device responsive to the decimal carry bit appearing at said carry output as a result of the addition of the most significant addend and augend bits of a given decimal denomination, said bistable device being in a first state when a decimal carry has been generated, and in a second state otherwise, gating means activated by said bistable device to apply to said input the dynamic bit signal 1 for addition to the fed back second least significant uncorrected sum bit of such given decimal denomination when said bistable device is in said first state, and otherwise for addition to its third and also its fourth least significant fed back uncorrected sum bit, a false decimal carry being generated in the latter case, means for applying to said input through said "or" gate the dynamic signal bit 1 in either case for addition to the fed back least significant uncorrected sum bit of each decimal denomination, whereby also to suppress said false decimal carry, and means for selectively gating out from said sum output the resulting corrected sum.

9. Means for adding an addend and an augend decimal number represented in excess-three code by timewise uniformly spaced serial dynamic bit signals, comprising a binary adder accepting said bits at an input thereof for serially adding the concurrent, denominationally corresponding bits of said numbers to produce at a sum output thereof a series of dynamic bit signals representing an uncorrected sum and at a carry output a series of dynamic bit signals representing the presence or absence of an interbit carry, a first feedback loop including delay means and an "or" gate for serially feeding back the carry bits from said carry output via said delay means and then via said "or" gate to said input for addition of a given carry bit with the next most significant addend and augend bits, a second feedback loop including delay means for serially feeding back the uncorrected sum bits from said sum output to said input for a second adding operation, said binary adder and second feedback loop having a combined delay greater than two but less than three bit spacings, and a third feedback loop intercoupling said carry output and input and comprising a bistable device responsive to the decimal carry bit appearing at said carry output as a result of the addition of the most significant addend and augend bits of a given decimal denomination, said bistable device being in a first state when a decimal carry has been generated, and in a second state otherwise, gating means activated by said bistable device to apply to said input the dynamic bit signal 1 for addition to the fed back second least significant uncorrected sum bit of such given decimal denomination when said bistable device is in said first state, and otherwise for addition to its third and also its fourth least significant fed back uncorrected sum bit, a false decimal carry being generated in the latter case, means for applying to said input through said "or" gate the dynamic signal bit 1 in either case for addition to the fed back least significant uncorrected sum bit of each decimal denomination, whereby also to suppress said false decimal carry, and means for selectively gating out from said sum output the resulting corrected sum.

10. In a data processor, means providing timewise uniformly spaced dynamic serial bit signals representing a set of data, processing means receiving said signals at an input thereof for serially and substantially instantly operating on the signals to produce at an output thereof timewise uniformly spaced dynamic serial bit signals representing a set of processed data, the processed signals being substantially synchronous with the respectively corresponding original unprocessed signals, feedback means for feeding back the processed signals from said output to said input for a second serial processing operation, the signals being fed back to said input after a time delay less than the time separating the first and the last of the original unprocessed signals but greater than the time separating any two consecutive original signals, said delay being selected so that the once processed signals arrive at said input asynchronously with any newly incoming original signals, whereby at least the next-to-last and last newly incoming signals are interspersed with a single once processed signal, and whereby at least the first and the second once processed output signals are uninterspersed by any twice processed signals and at least the next-to-last and last once processed iutput signals are interspersed with a single twice processed signal, and means coupled to said output for selectively gating out data-set-representing timewise uniformly spaced dynamic serial bit signals that have been processed a like number of times and at least twice.

11. In a data processor, means providing timewise uniformly spaced dynamic serial bit signals representing a set of data, processing means receiving said signals at an input thereof for serially and substantially instantly operating on the signals to produce at an output thereof timewise uniformly spaced dynamic serial bit signals representing a set of processed data, the processed signals being substantially synchronous with the respectively corresponding original unprocessed signals, feedback means for feeding back the processed signals from said output to said input for a second serial processing operation, the signals being fed back to said input after a time delay less than the time separating the first and the last of the original unprocessed signals but greater than the time separating any two consecutive original signals, said delay being selected so that the once processed signals arrive at said input asynchronously with any newly incoming original signals, whereby at least the next-to-last and last newly incoming signals are interspersed with a single once processed signal, and whereby at least the first and the second once processed output signals are uninterspersed by any twice processed signals and at least the next-to-last and last once processed output signals are interspersed with a single twice processed signal, and means coupled to said output for selectively gating out data-set-representing twice processed timewise uniformly spaced dynamic serial bit signals while blocking the once processed signals, and for selectively gating to said feedback means the once processed signals while blocking therefrom the twice processed signals.

12. In a computing system having means providing first periodic clock pulse signals and second periodic clock pulse signals, the latter having the same pulse period, but being displaced in time with respect to said first clock pulse signals: means providing dynamic serial bit signals, representing a set of data, consecutive bits being essentially synchronous with consecutive ones of said first clock pulse signals, processing means receiving said bit signals at an input thereof for serially operating on the bit signals to produce at an output thereof dynamic serial bit signals representing a set of processed data, feedback means for feeding back the processed bit signals from said output to said input for a second serial processing operation, the consecutive once processed bit signals arriving at said input delayed in time with respect to the corresponding original, unprocessed bit signals and essentially synchronously with consecutive ones of said second clock pulse signals, the delay being less than the time separating the first and the last of the original, unprocessed bit signals but greater than the time separating any two consecutive original, unprocessed bit signals, whereby at least the next-to-last and last newly incoming bit signals are interspersed with a once processed bit signal, and whereby at least the first and the second once processed output bit signals are uninterspersed by a twice processed bit signal and at least the next-to-last and last once processed output bit signals are interspersed with a twice processed bit signal, and means coupled to said output for selectively gating out data-set-representing timewise uniformly spaced dynamic serial bit signals that have been processed a like number of times and at least twice.

13. In a computing system having means providing first periodic clock pulse signals and second periodic clock pulse signals, the latter having the same pulse period, but being displaced in time with respect to said first clock pulse signals: means providing dynamic serial bit signals, representing a set of data, consecutive bits being essentially synchronous with consecutive ones of said first clock pulse signals, processing means receiving said bit signals at an input thereof for serially operating on the bit signals to produce at an output thereof dynamic serial bit signals representing a set of processed data, feedback means for feeding back the processed bit signals from said output to said input for a second serial processing operation, the consecutive once processed bit signals arriving at said input delayed in time with respect to the corresponding original, unprocessed bit signals and essentially synchronously with consecutive ones of said second clock pulse signals, the delay being less than the time separating the first and the last of the original, unprocessed bit signals but greater than the time separating any two consecutive original, unprocessed bit signals, whereby at least the next-to-last and last newly incoming bit signals are interspersed with a once processed bit signal, and whereby at least the first and the second once processed output bit signals are uninterspersed by a twice processed bit signal and at least the next-to-last and last once processed output bit signals are interspersed with a twice processed bit signal, and means coupled to said output for selectively gating out data-set-representing twice processed timewise uniformly spaced dynamic serial bit signals while blocking the once processed bit signals, and for selectively gating to said feedback means the once processed bit signals while blocking therefrom the twice processed bit signals.

14. Means for adding an addend and an augend decimal number, each decimal digit being represented in a multi-bit code, that is compatible with binary addition rules, by timewise uniformly spaced serial dynamic bit signals, comprising a binary adder accepting said bits at an input thereof for serially adding the concurrent. denominationally corresponding bits of said numbers to produce at a sum output thereof a series of dynamic bit signals representing the pure binary sum and at a carry output bit signals representing the presence or absence of a tens' carry, means for probing at least one of the sum and carry outputs to determine whether or not the decimal sum in a given denomination exceeds nine, a feedback loop including delay means for serially feeding back the pure binary sum bits from said sum output to said input for a second adding operation, said pure binary sum bits arriving at said input delayed in time with respect to the denominationally corresponding addend and augend bits, the delay being greater than two but less than three bit spacings, a further feedback loop responsive to the probing means for effecting any appropriate and required decimal correction, including means for applying to said input the dynamic signal bit 1 for addition to preselected fed back pure binary sum bits of such given decimal denomination, and means for selectively gating out from said sum output the resulting corrected sum.

15. Means for adding an addend and an augend decimal number, each decimal digit being represented in a multi-bit code, that is compatible with binary addition rules, by timewise uniformly spaced serial dynamic bit signals, comprising a binary adder accepting said bits at an input thereof for serially adding the concurrent, denominationally corresponding bits of said numbers to produce at a sum output thereof a series of dynamic bit signals representing the pure binary sum and at a carry output bit signals representing the presence or absence of a tens' carry, means for probing at least one of the sum and carry outputs to determine whether or not the decimal sum in a given denomination exceeds nine, a feedback loop including delay means for serially feeding back the pure binary sum bits from said sum output to said input for a second adding operation, said pure binary sum bits arriving at said input delayed in time with respect to the denominationally corresponding addend and augend bits and asynchronously with any newly incoming addend and augend bits, the delay being greater than two bit spacings but less than the time interval separating the first and last bits of the original addend and augend numbers, a further feedback loop responsive to the probing means for effecting any appropriate and required decimal correction, including means for applying to said input the dynamic signal bit 1 for addition to preselected fed back pure binary sum bits of such given decimal denomination, and means for selectively gating out from said sum output the resulting corrected sum.

16. Means for adding an addend and an augend decimal number, each decimal digit being represented in a multi-bit excess code, that is compatible with binary addition rules, as distinguished from straight binary code, by timewise uniformly spaced serial dynamic bit signals, comprising a binary adder accepting said bits at an input thereof for serially adding the concurrent, denominationally corresponding bits of said numbers to produce at a sum output thereof a series of dynamic bit signals representing an uncorrected sum and at a carry output, signals representing the presence or absence of a tens' carry, means for probing at least one of the sum and carry outputs to determine whether or not the decimal sum in a given denomination exceeds nine, a feedback loop including delay means for serially feeding back the uncorrected sum bits from said sum output to said input for a second adding operation, said uncorrected sum bits arriving at said input delayed in time with respect to the denominationally corresponding addend and augend bits, the delay being greater than two but less than three bit spacings, a further feedback loop responsive to the probing means for effecting the appropriate decimal correction, including means for applying to said input the dynamic signal bit 1 for addition to preselected fed back uncorrected sum bits of such given decimal denomination, means for suppressing addition of a false decimal carry to the least significant addend and augend bits of the next higher decimal denomination, and means for selectively gating out from said sum output the resulting corrected sum.

17. Means for adding an addend and an augend decimal number, each decimal digit being represented in a multi-bit excess code, that is compatible with binary addition rules, as distinguished from straight binary code, by timewise uniformly spaced serial dynamic bit signals, comprising a binary adder accepting said bits at an input thereof for serially adding the concurrent, denominationally corresponding bits of said numbers to produce at a sum output thereof a series of dynamic bit signals representing an uncorrected sum and at a carry output, signals representing the presence or absence of a tens' carry, means for probing at least one of the sum and carry outputs to determine whether or not the decimal sum in a given denomination exceeds nine, a feedback loop including delay means for serially feeding back the uncorrected sum bits from said sum output to said input for a second adding operation, said uncorrected sum bits arriving at said input delayed in time with respect to the denominationally corresponding addend and augend bits and asynchronously with any newly incoming addend and augend bits, the delay being greater than two bit spacings but less than the time interval separating the first and last bits of the original addend and augend numbers, a further feedback loop responsive to the probing means for effecting the appropriate decimal correction, including means for applying to said input the dynamic signal bit 1 for addition to preselected fed back uncorrected sum bits of such given decimal denomination, means for suppressing addition of a false decimal carry to the least significant addend and augend bits of the next higher decimal denomination, and means for selectively gating out from said sum output the resulting corrected sum.

References Cited in the file of this patent

UNITED STATES PATENTS

| | | |
|---|---|---|
| 2,600,744 | Echert et al. | June 17, 1952 |
| 2,609,143 | Stibitz | Sept. 2, 1952 |
| 2,641,696 | Woolard | June 9, 1953 |
| 2,705,108 | Stone | Mar. 29, 1955 |
| 2,774,056 | Stafford et al. | Dec. 11, 1956 |
| 2,776,418 | Townsend | Jan. 1, 1957 |
| 2,798,156 | Selmer | July 2, 1957 |
| 2,803,401 | Nelson | Aug. 20, 1957 |
| 2,887,269 | Reisch | May 19, 1959 |

OTHER REFERENCES

"High-Speed Computing Devices," by Engineering Research Associates, published McGraw-Hill Book Co. (1950), New York (pp. 289–293).